United States Patent
Yasuma et al.

(10) Patent No.: US 9,841,755 B2
(45) Date of Patent: Dec. 12, 2017

(54) JOB PLAN CREATION SYSTEM

(71) Applicant: TOYOTA JIDOSHA KABUSHIKI KAISHA, Toyota-shi, Aichi (JP)

(72) Inventors: Takashi Yasuma, Nisshin (JP); Hideyuki Tagami, Anjo (JP); Katsuhiro Ito, Nagakute (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 323 days.

(21) Appl. No.: 14/627,432

(22) Filed: Feb. 20, 2015

(65) Prior Publication Data

US 2015/0261216 A1 Sep. 17, 2015

(30) Foreign Application Priority Data

Mar. 13, 2014 (JP) ................................. 2014-050566

(51) Int. Cl.
*G05B 19/418* (2006.01)

(52) U.S. Cl.
CPC ............... *G05B 19/41865* (2013.01); *G05B 2219/32271* (2013.01); *G05B 2219/34379* (2013.01); *Y02P 90/14* (2015.11); *Y02P 90/20* (2015.11)

(58) Field of Classification Search
CPC .... G05B 19/41865; G05B 2219/32271; G05B 2219/34379; Y02P 90/14; Y02P 90/20
See application file for complete search history.

(56) References Cited

U.S. PATENT DOCUMENTS

| | | | | |
|---|---|---|---|---|
| 4,700,318 A | * | 10/1987 | Ockman | G06Q 10/06 345/595 |
| 5,237,508 A | | 8/1993 | Furukawa et al. | |
| 2004/0225394 A1 | * | 11/2004 | Fromherz | G06Q 10/06 700/101 |
| 2005/0096770 A1 | * | 5/2005 | Chua | G05B 19/41865 700/102 |
| 2006/0197977 A1 | * | 9/2006 | Miyata | G06F 3/1204 358/1.15 |
| 2010/0191705 A1 | * | 7/2010 | Barabas | G06F 17/30362 707/626 |
| 2012/0035975 A1 | * | 2/2012 | Sugimoto | G06Q 10/06316 705/7.26 |

(Continued)

FOREIGN PATENT DOCUMENTS

| | | |
|---|---|---|
| JP | 05108659 A | 4/1993 |
| JP | 05298328 A | 11/1993 |

(Continued)

*Primary Examiner* — Sean Shechtman
*Assistant Examiner* — Tri T Nguyen
(74) *Attorney, Agent, or Firm* — Oliff PLC

(57) ABSTRACT

Provided is a job plan creation system capable of creating an efficient job plan when the job plan is reconfigured on the basis of the progress of the jobs after the completion of the jobs that day and by the job starting time of the following day, for example. A job plan creation system extracts an interrupted job that has been started but has not been completed, a delayed job that should have been started based on the job plan but has not been started, and a not-started job that is scheduled to be started on the job plan and so has not been started from the job plan, and creates the job plan while setting priorities in the order of the interrupted job, the delayed job and the not-started job.

11 Claims, 6 Drawing Sheets

(56) References Cited

U.S. PATENT DOCUMENTS

2013/0190913 A1 7/2013 Lamparter et al.

FOREIGN PATENT DOCUMENTS

| JP | 2562519 B2 | 9/1996 |
| JP | 10180596 A | 7/1998 |
| JP | 10269196 A | 10/1998 |
| JP | 10309654 A | 11/1998 |
| JP | 2004-030199 A | 1/2004 |
| JP | 2005-190062 A | 7/2005 |
| JP | 2006065566 A | 3/2006 |
| JP | 2012174140 A | 9/2012 |
| JP | 2014-063293 A | 4/2014 |
| JP | 2014119871 A | 6/2014 |
| JP | 5609600 B2 | 10/2014 |
| JP | 2014222409 A | 11/2014 |

* cited by examiner

FIG. 3

| Overall line | | All operators | | | | | | | | | | | | Year, Month, Date | | | | | | | | | | |
|---|---|---|---|---|---|---|---|---|---|---|---|---|---|---|---|---|---|---|---|---|---|---|---|---|---|
| | | | | A | | B | | C | | | D | | | E | | | F | | | | | | | | |
| Manufacturing No. | Figure No. Product No. | Process No. | Setup type | Machine time | 8 | 9 | 10 | 11 | 12 | 13 | 14 | 15 | 16 | 17 | 18 | 19 | 20 | 21 | 22 | 23 |
| 000001 | 001 | 010 | α | 2:00 | | □ | | | | | | | | | | | | | | |
| 000001 | 001 | 020 | β | 0:30 | | | | □ | | | | | | | | | | | | |
| 000001 | 001 | 030 | α | 2:30 | | | | | □ | □ | | | | | | | | | | |
| 000001 | 002 | 010 | γ | 1:30 | | | □ | | | | | | | | | | | | | |
| 000001 | 002 | 020 | γ | 3:00 | | | | | | | | □ | □ | | | | | | | |
| | | | | | | | | | | | | | | | | | | | | |
| | | | | | | | | | | | | | | | | | | | | |
| 000002 | 002 | 010 | α | 1:00 | | | | | | | | | | | | | □ | | | |
| 000002 | 002 | 020 | γ | 1:30 | | | | | □ | | | | | | | | | | | |

JOB PLAN CREATION SYSTEM

BACKGROUND

Technical Field

The present invention relates to a job plan creation system, and relates to a job plan creation system to create a job plan of a NC (Numerical Control) job by a NC machine tool, for example.

Background Art

Conventionally production facilities to manufacture various components such as motors, batteries, and semiconductors used for vehicles or the like are manufactured by preparing a plurality of components of the production facility using NC machine tools individually and assembling such a plurality of components.

In recent years, to manufacture these components of production facilities, a plurality of NC machine tools are disposed along a plurality of processing lines, and the operating state of these NC machine tools disposed along the processing lines are collectively controlled by a central computer (Direct Numerical Control (DNC)), so as to shorten the lead time to manufacture the production facilities and suppress their manufacturing cost. Management data of the plurality of NC machine tools under the DNC, such as the processing state, is displayed simultaneously on a screen of the central computer, allowing a supervisor, an operator or the like to check the processing state of the NC machine tools at one time.

Meanwhile, in such a manufacturing process of the production facilities, it is requested to create a production plan so as not to generate wasted idle time at each line for better manufacturing efficiency of each manufacturing line or processing line, and Patent Document 1 discloses a conventional technique to respond to such a request.

A production plan creation system disclosed in Patent Document 1 is to, for jobs that are the combination of a plurality of orders and necessary steps to produce the products ordered, allocate not-started jobs to resources such as facilities and manpower to recreate a production plan. For this purpose, this system is configured, when a preparation job accompanying such a not-started job has been already started, to select a resource whose preparation job has been started as a resource to which the not-started job is to be allocated.

According to the production plan creation system disclosed in Patent Document 1, a production plan is recreated so that when a preparation job is started, the resource to which the job is to be allocated is limited, and so the job will not be allocated to the resource whose preparation job has not been started, meaning that the preparation job will not be wasted.

RELATED ART DOCUMENT

Patent Document

Patent Document 1: JP 2005-190062 A

SUMMARY

Meanwhile, in the above-stated production facility manufacturing process or the like, a part of the job with low priority may be performed when the work load is low due to the states of the work load at the processing lines, for example. Alternatively even when a certain job is started on the basis of the priorities or the like for a job plan, the priority of the job being performed decreases before the completion of the job because of a change of the production plan, for example. A production facility manufacturing process is typically configured to reconfigure the job plan on the basis of the progress of each job after the completion of the jobs for the day and before the job starting time of the following day, for example. Then in the case where the job with a low priority is performed but the entire job is not completed by the end of the day, or in the case where the priority of the job that is not completed entirely by the end of the day decreases due to a change of the production plan or the like as stated above, if the job plan is reconfigured while keeping the priority as it is without considering the interruption state of the job, such an interrupted job (the job that is not completed entirely by the end of the day) will be postponed, resulting in that the processes such as preparation of cutting tools or machine setups for the production line or the processing line may be wasted or be duplicated.

Patent Document 1 discloses the case where a preparation job accompanying a not-started job has been already started, but does not mention how to reconfigure a job plan when the interrupted job is generated as stated above. Further the production plan creation system disclosed in Patent Document 1 does not specify the relationship between a not-started job whose preparation job has been already started and other jobs, and so a problem still remains, such as that an efficient production plan cannot be created.

In view of these problems, the present invention aims to provide a job plan creation system capable of creating an efficient job plan reliably when the job plan is reconfigured on the basis of the progress of the jobs after the completion of the jobs that day and by the job starting time of the following day, for example.

In order to fulfill the above object, a job plan creation system of the present invention creates a job plan for each job on a basis of starting states of the jobs. The job plan creation system extracts at least an interrupted job that has been started but has not been completed, a delayed job that should have been started based on the job plan but has not been started, and a not-started job that is scheduled to be started on the job plan and so has not been started from the job plan, and reconfigures the job plan while setting priorities in the order of the interrupted job, the delayed job and the not-started job.

According to the job plan creation system as stated above, at least an interrupted job that has been started but has not been completed, a delayed job that should have been started based on the job plan but has not been started, and a not-started job that is scheduled to be started on the job plan and so has not been started are extracted, and the job plan is reconfigured while setting priorities in the order of the interrupted job, the delayed job and the not-started job so as to put higher priority on the interrupted job than the delayed job and the not-started job. This can reduce wasting or duplication of the processes such as preparation of cutting tools or machine setups for the production line or the processing line in the production facility manufacturing process, and so can increase the manufacturing efficiency or the processing efficiency and can shorten the lead time to manufacture the production facilities and suppress their manufacturing cost.

The job plan creation system as stated above extracts a postponement job that is to be postponed in operating time on a basis of a predetermined condition from the interrupted jobs, and reconfigures the job plan. The predetermined condition may include a type of the interrupted job, margin for a delivery time, and priority, for example.

According to the job plan creation system as stated above, a postponement job that is to be postponed in operating time by predetermined duration is extracted on a basis of a predetermined condition from the interrupted jobs to reconfigure the job plan. Thereby an appropriate job of the interrupted jobs can be postponed to an appropriate time to reconfigure the job plan, which can further increase the manufacturing efficiency or the processing efficiency.

It is preferable that the job plan creation system postpone an operating time of a not-completed part of the postponement job to reconfigure the job plan.

The job plan creation system as stated above may reconfigure the job plan by reversing the order on the job plan of the not-completed part and another job on a basis of priority and/or a delivery time. It is preferable that the job plan creation system reverses the order on the job plan of the not-completed part and another job, which is determined as having priority that is equal to or lower than the priority of the not-completed part and as having margin for delivery time compared with the not-completed part.

The job plan creation system as stated above can reconfigure the job plan by reversing the order on the job plan between the not-completed part of the postponement job and another job on the basis of priority and/or delivery time. This can create an optimum job plan even when the priority of the interrupted job decreases relatively because a job with high priority is planned later, for example, and so can further increase the manufacturing efficiency or the processing efficiency more reliably.

As can be understood from the above description, the job plan creation system of the present invention enables creation of an efficient job plan reliably when the job plan is reconfigured on the basis of the progress of the jobs after the completion of the jobs that day and by the job starting time of the following day, for example.

BRIEF DESCRIPTION OF THE DRAWINGS

FIG. 3 illustrates another exemplary job plan created by the scheduling creation unit of FIG. 1.

DETAILED DESCRIPTION OF THE EMBODIMENT(S)

The following describes embodiments of the present invention, with reference to the drawings. The following mainly and specifically describes a job plan creation system to create a job plan for each NC machine tool in the production facility manufacturing process to manufacture a production facility using a plurality of NC machine tools disposed at a plurality of processing lines.

Embodiment 1

Figure 1:
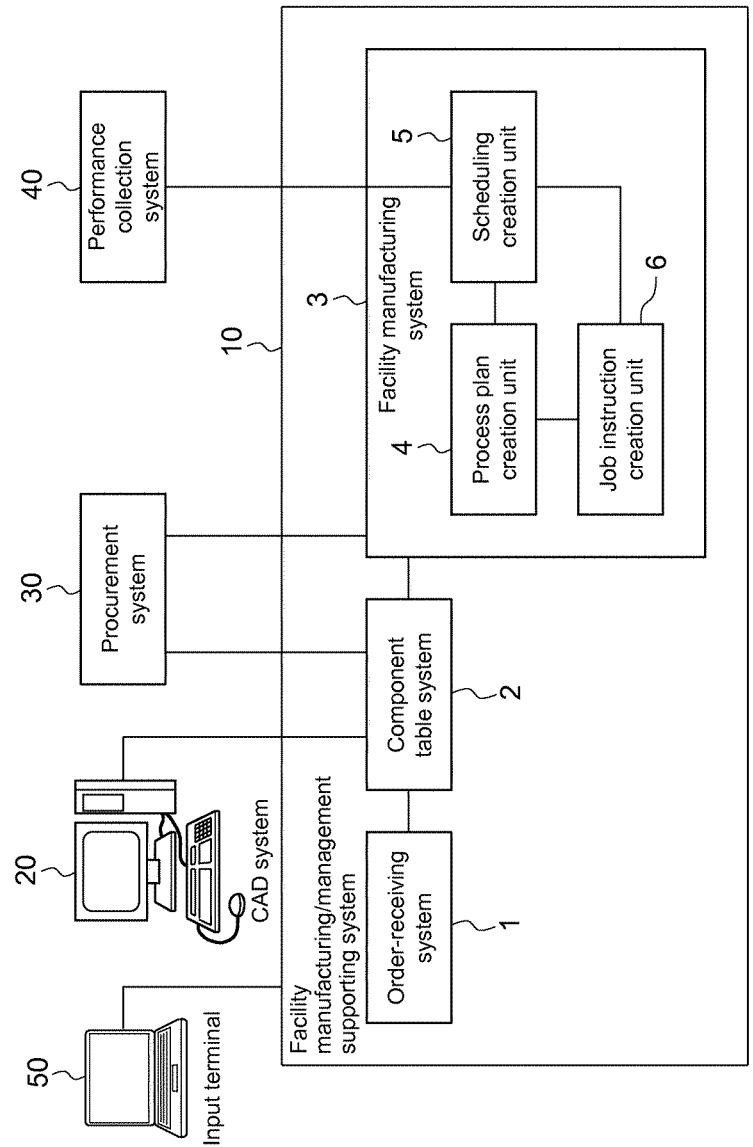
FIG. 1 illustrates the basic configuration of a facility manufacturing/management supporting system, to which a job plan creation system that is Embodiment 1 of the present invention is applied.

FIG. 1 illustrates the basic configuration of a facility manufacturing/management supporting system, to which the job plan creation system that is Embodiment 1 of the present invention is applied. A facility manufacturing/management supporting system 10, for example, works together with a CAD system 20 to create design data (CAD data) on a facility or a machine to be manufactured or their components, a procurement system 30 to create procurement data on orders and purchase of materials and components to be used, a performance collection system 40 to collect actual performance data on the jobs, such as the starting or the completion of a job, the operating time required for the job, and an operator performing the job, to support the manufacturing of the facility and the machine or the management of them. The facility manufacturing/management supporting system 10 is connected to an input terminal 50, allowing an operator, a supervisor or the like to input various types of data and displaying calculation results, job instructions and the like to an operator, a supervisor or the like.

The illustrated facility manufacturing/management supporting system 10 mainly includes: an order-receiving system 1 that processes a manufacturing request and assigns a management number, for example; a component table system 2 that creates a list on facilities or machines to be manufactured and their components or drawings, for example, on the basis of information created by the order-receiving system 1, design data created by the CAD system 20 and procurement data created by the procurement system 30; and a facility manufacturing system 3 that creates a manufacturing plan of each manufacturing line or processing line and job instructions to operators or the like on the basis of the information created by the component table system 2, the procurement data created by the procurement system 30 and the like.

The facility manufacturing system 3 in the facility manufacturing/management supporting system 10 further includes: a process plan creation unit 4 that creates a process plan on job processes such as "component manufacturing (processing)", "unit manufacturing (sub-assembling)", and "general assembling" on the basis of the information (information on facilities or machines to be manufactured and their components) created by the component table system 2, the procurement data created by the procurement system 30 and the like; a scheduling creation unit (job plan creation system) 5 that creates a job plan on jobs by an operator or the like at each job process; and a job instruction creation unit 6 that creates an instruction sheet to an operator or the like on the basis of the process plan and the job plan created by the process plan creation unit 4 and the scheduling creation unit 5.

Figure 2:
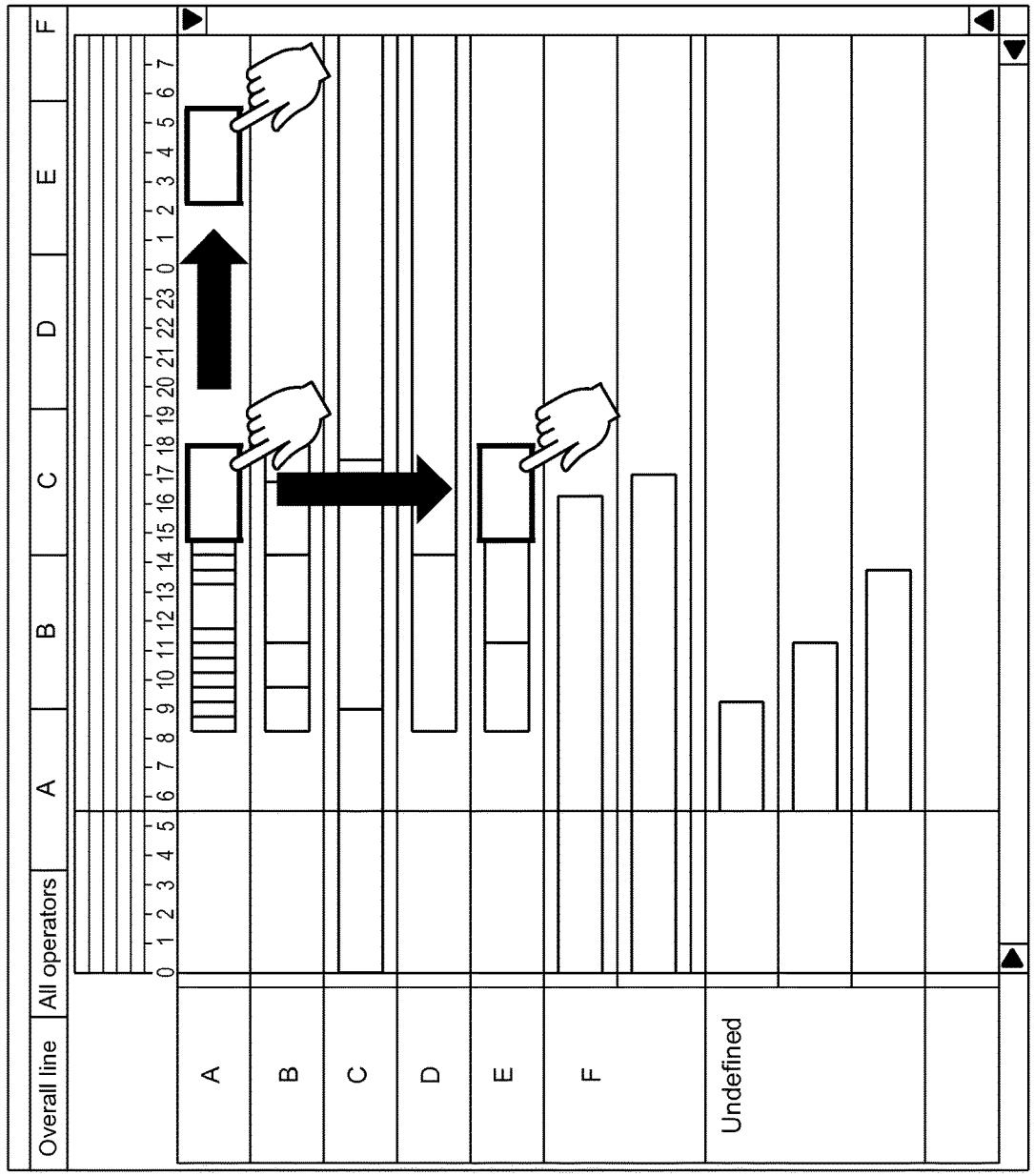
FIG. 2 illustrates an exemplary job plan created by the scheduling creation unit of FIG. 1.

FIG. 2 illustrates an exemplary job plan created by the scheduling creation unit 5 of FIG. 1. In FIG. 2, the vertical axis mainly represents identification symbols of the NC machine tools disposed at each processing line, and the horizontal axis represents the plan (date and time), where each job in the job plan created by the scheduling creation unit 5 is represented as rectangular blocks ("job bars"). An "undefined" region located at a lower part of FIG. 2 displays jobs that are not allocated to any NC machine tool at the planning stage. For instance, jobs such as an unexpected job due to design change or an important job that are to be planned while changing the plan flexibly (e.g., changing the plan manually) depending on the situation at that time, and not to be incorporated automatically into the job plan, are displayed in this "undefined" region.

The job plan illustrated in FIG. 2 is displayed on a touch panel screen, for example, enabling an operator or the like to change the job plan by an operation such as tapping and sliding at the operator's demand. For instance, an operator or the like can perform operations such as tapping and sliding thereto to assign a job of a certain NC machine tool to another NC machine tool or to change the operating time or the delivery time of a job of a certain NC machine tool.

The job plan illustrated in FIG. 2 can be displayed as a job plan for each NC machine tool as illustrated in FIG. 3, in response to a predetermined operation (e.g., selection of a tab disposed at an upper part of FIG. 2 or selection of the fields of the NC machine tools along the vertical axis) by an operator, a supervisor or the like. At this time, the operator or the like can perform operations such as tapping and sliding to make a plan (assign) of a job that is displayed at the "undefined" region at a desired time for (to) the corresponding NC machine tool. Alternatively the operator or the like can perform operations such as tapping and sliding to move a part of the jobs planed for the NC machine tools to the "undefined" region.

Figure 4:
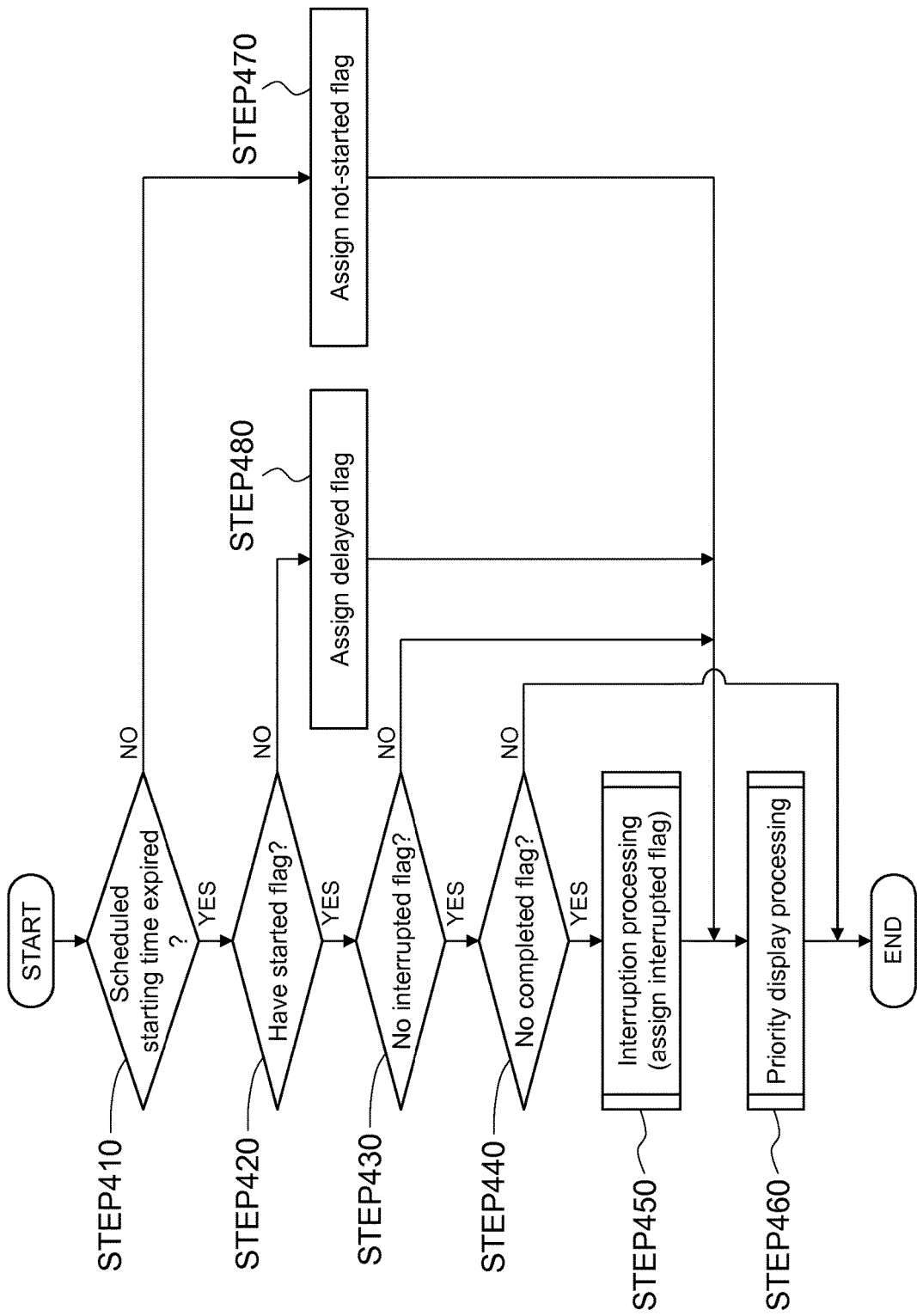
FIG. 4 is a flowchart to describe the display processing flow by the scheduling creation unit of FIG. 1.
Figure 5:
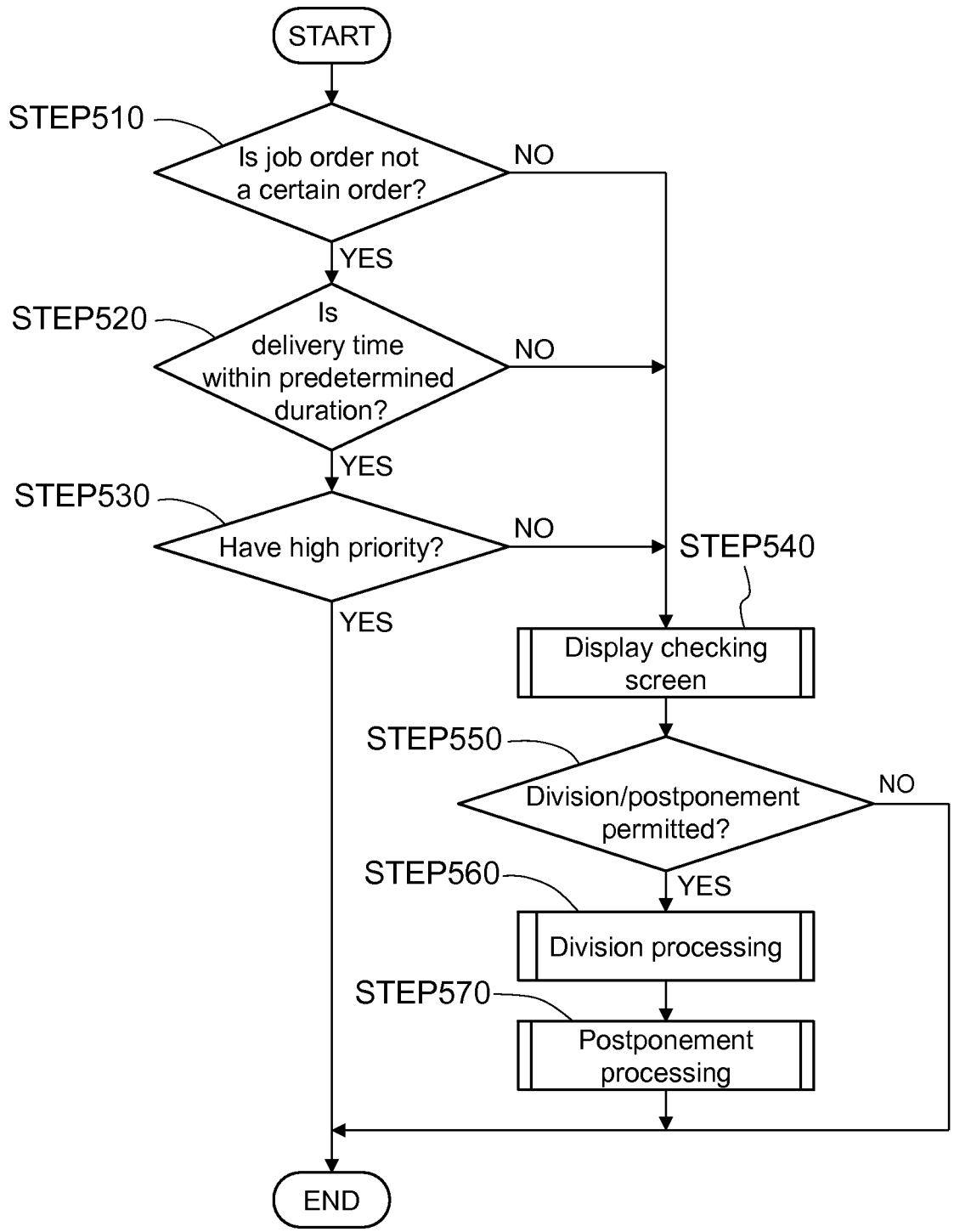
FIG. 5 is a flowchart to describe the postponement processing flow by the scheduling creation unit of FIG. 1.

Referring now to FIGS. 4 and 5, the following specifically describes a method for creating a job plan by the scheduling creation unit (job plan creation system) 5 illustrated in FIG. 1. This scheduling creation unit 5 is configured to reconfigure a job plan of each job on the basis of the progress or the like of each job that is transmitted from the performance collection system 40 after the completion of the jobs that day and by the job starting time of the following day. At this time, if the job plan is created only based on whether the jobs have been completed or not, for example, a job that has been started but has not been completed (interrupted job) will be postponed compared with a job that is to be started based on the job plan but has not been started (delayed job) or a job that is not started because it is scheduled to be started from now based on the job plan (not-started job), which may make the processes such as preparation of cutting tools or machine setups for the production line or the processing line wasted or be duplicated. To avoid this, the scheduling creation unit 5 creates a job plan so as to prioritize an interrupted job that influences more on the processes before and after the job.

Specifically as illustrated in FIG. 4, the scheduling creation unit 5 firstly determines whether, for a job on the job plan, its scheduled starting time that is planed on the job plan has expired or not (STEP 410), and when it is determined as expired, the procedure proceeds to STEP 420. On the other hand, when it is determined as not expired, the scheduling creation unit 5 determines the job as a not-started job that is scheduled to be started from now on the job plan, and assigns a not-started flag to the job (STEP 470).

Next, the scheduling creation unit 5 determines, for the job that is determined at STEP 410 that the scheduled starting time on the job plan has expired, whether it has a started flag or not on the basis of the information transmitted from the performance collection system 40, i.e., whether the job has been already started or not (STEP 420). When it is determined as having a started flag, the procedure proceeds to STEP 430. On the other hand, it is determined as not having a started flag, the scheduling creation unit 5 determines the job as a delayed job that should have been started based on the job plan but has not been started, and assigns a delayed flag to the job (STEP 480).

Next, the scheduling creation unit 5 determines, for the job that is determined as having a started flag at STEP 420, whether it has an interrupted flag or not on the basis of the information transmitted from the performance collection system 40 so as to determine whether the job has been started but has not been completed, i.e., interrupted, or not (STEP 430). When it is determined as not having an interrupted flag, the procedure processes to STEP 440, and when it is determined as having an interrupted flag already, the procedure proceeds to STEP 460.

Next, the scheduling creation unit 5 determines, for the job that is determined as not having an interrupted flat at STEP 430, whether it has a completed flag or not on the basis of the information transmitted from the performance collection system 40, i.e., whether the job has not been completed or not (STEP 440). When it is determined as not having a completed flag, the procedure proceeds to STEP 450. On the other hand, when it is determined as having a completed flag, it is determined that the job itself has been completed, and the procedure ends.

The scheduling creation unit 5 determines, for the job that is determined as having a starting flag at STEP 420, as not having an interrupted flag at STEP 430, and as not having a completed flag at STEP 440, that an operator or the like forgot to assign the interrupted flag thereto, and assigns an interrupted flag (interruption processing) (STEP 450). This allows the scheduling creation unit 5 to extract an interrupted job that has been started but has not been completed from the job plan reliably.

Then the scheduling creation unit 5 reconfigures the job plan on the basis of the flags assigned to the jobs on the job plan, such as an interrupted flag, a delayed flag and a not-started flag. Specifically the scheduling creation unit 5 sets the order of priorities (priorities) in the order of an interrupted job, a delayed job and a not-started job to reconfigure the job plan of each job by the job starting time of the following day, and makes the display device of the input terminal 50, for example, display the job plan (priority display processing) (STEP 460). At this time, the scheduling creation unit 5 may display these interrupted job, delayed job and not-started job in different colors, for example, whereby even when the job is allocated (moved) to the "undefined" region (see FIG. 2), the operator, the supervisor or the like can identify the starting state of the job correctly.

Meanwhile, interrupted jobs extracted by the scheduling creation unit 5 often include a job such as a "filling-in-the-blank type" job with low necessity for delivery time management and with low priority, including the manufacturing of a test piece to examine the processing condition, which is incorporated for levelling-off of the work load when the work load is low, or a job with priority decreased because the delivery time is extended due to a change of the production plan, for example. Then the scheduling creation unit 5 determines whether the job is to be "postponed" or not on the basis of predetermined conditions such as the type of the job (e.g., whether it is a "filling-in-the-blank type" job or not), the delivery time, and the priority, and when it is determined as a job to be "postponed", the scheduling creation unit 5 divides it into a complete part or a not-completed part (remaining job part), and creates the job plan so that the operating time of the not-completed part only is postponed by predetermined duration.

Specifically as illustrated in FIG. 5, the scheduling creation unit 5 firstly determines, for the job with an interrupted flag assigned, whether the job order is a certain order or not relating to a certain job that does not relate directly to the production of the product, such as manufacturing of a test piece (STEP 510), and when it is determined as the certain order, the procedure proceeds to STEP 540. When the job order is not determined as the certain order, the procedure proceeds to STEP 520.

Next, the scheduling creation unit 5 determines, for the job corresponding to the job order that is not determined as the certain order at STEP 510, whether the delivery time of the job is within predetermined duration or not, i.e., whether the duration before the delivery time is long enough or not (STEP 520). When it is determined that the delivery time is not within the predetermined duration (the duration is long enough), the procedure proceeds to STEP 540, and when it is determined that the delivery time is within the predetermined duration (the duration is not long enough), the procedure proceeds to STEP 530. Herein information on the delivery time of each job is input or changed by the order-receiving system 1, and the predetermined duration that becomes a determination criterion whether the duration until the delivery time is long enough or not can be set on the basis of a standard operating time or the like that is required for the job, for example. For instance, when the standard operating time required for a certain job is one month, the job can be completed in a month at the earliest, but the predetermined duration can be set at two month while giving margin thereto. This standard operating time can be an actual operating time value by a certain operator, an average of the actual operating times by a plurality of operators, or an expected value that is expected from an actual operating time value by a certain operator or the actual operating times by a plurality of operators, which are collected by the performance collection system 40, for example.

Next, the scheduling creation unit 5 determines, for the job whose delivery time is within the predetermined duration at STEP 520, whether the priority of the job is high or not on the basis of a priority flag that is assigned or changed by the order-receiving system 1, the performance collection system 40 and the like (STEP 530). When it is determined that the job has relatively low priority, the procedure proceeds to STEP 540. On the other hand, when it is determined that the job has relatively high priority, the procedure ends, and as described above with reference to FIG. 4, the scheduling creation unit 5 reconfigures the job plan so as to put higher priority on the interrupted job extracted by the scheduling creation unit 5 than a delayed job, a not-started job or the like, and makes the display device of the input terminal 50, for example, display the job plan.

To check with an operator, a supervisor or the like whether the processing (division processing and postponement processing) can be executed or not so as to divide the interrupted job that is determined as corresponding to the certain order, as having the delivery time not within the predetermined duration (the duration is long enough) or as having relatively low priority into a completed job part (completed part) and a not-completed job part (not-completed part, remaining job part), and to postpone the not-completed part, the scheduling creation unit 5 makes the display device of the input terminal 50, for example, display the checking screen (STEP 540). This checking screen displays "Yes" to permit the execution of the division processing and postponement processing and "No" not to permit (prohibit) the division processing and postponement processing, for example.

Next, the scheduling creation unit 5 determines whether the execution of the division processing and postponement processing is permitted or not through the checking screen displayed at STEP 540 (STEP 550), and when it is determined that the execution of the division processing and postponement processing is permitted (e.g., when the operator, the supervisor or the like selects "Yes" on the checking screen), the procedure proceeds to STEP 560. On the other hand, when it is determined that the execution of the division processing and postponement processing is not permitted (prohibited), the procedure ends, and as described above with reference to FIG. 4, the scheduling creation unit 5 reconfigures the job plan so as to put higher priority on the interrupted job extracted by the scheduling creation unit 5 than a delayed job, a not-started job or the like, and makes the display device of the input terminal 50, for example, display the job plan.

Next, for the interrupted job that is determined so that the execution of the division processing and postponement processing thereof is permitted at STEP 550, the scheduling creation unit 5 divides it into a completed part and a not-completed part, assigns a completed flag to the completed part and newly assigns an interrupted flag to the not-completed part (division processing) (STEP 560).

Then, the scheduling creation unit 5 postpones the operating time of the not-completed part, to which the interrupted flag is assigned at STEP 560, by the predetermined postponement duration (postponement processing), reconfigures a new job plan so that the job will not be a target of the job plan before the operating time, and makes the display device of the input terminal 50, for example, display the job plan (STEP 570). The scheduling creation unit 5 further may assign a temporary flag that prohibits the not-completed part, to which the interrupted flag is assigned at STEP 560, from being incorporated (allocated) to the job plan in the predetermined postponement duration, and then reconfigure a new job plan.

In the above embodiment, a determination is made as to whether the execution of the division processing and postponement processing is permitted or not at STEP 540 and STEP 550. However, STEP 540 and STEP 550 may be omitted, and when an interrupted job is determined as corresponding to the certain order, as having the delivery time not within the predetermined duration (the duration is long enough) or as having relatively low priority, the scheduling creation unit can execute the division processing and postponement processing thereto automatically.

In this way, according to Embodiment 1, a job plan is reconfigured as follows on the basis of progress of each job after the completion of the jobs that day and by the job starting time of the following day, for example. That is, an interrupted job that has been started but has not been completed, a delayed job that should have been started based on the job plan but has not been started, and a not-started job that is scheduled to be started on the job plan and so has not been started are extracted from jobs on the job plan, and the job plan is reconfigured while setting priorities in the order of the interrupted job, the delayed job and the not-started job so as to put higher priority on the interrupted job than the delayed job and the not-started job. This can reduce wasting or duplication of the processes such as preparation of cutting tools or machine setups for the production line or the processing line in the production facility manufacturing process, and so can increase the manufacturing efficiency or the processing efficiency and can shorten the lead time to manufacture the production facilities and suppress their manufacturing cost.

Further, a determination is made for the interrupted job as to whether it is to be postponed or not, and when it is determined that the interrupted job is to be postponed, the interrupted job is divided into a complete part or a not-completed part (remaining job part), and the operating time of the not-completed part only can be postponed by predetermined duration. Thereby, the job plan can be created depending on various situations such as levelling-off of the work load and change in priority due to a change of the production plan, for example, which can increase the manufacturing efficiency or the processing efficiency more and can shorten the lead time to manufacture the production facilities and suppress their manufacturing cost more.

Embodiment 2

Embodiment 1 as stated above describes the embodiment such that the operating time is postponed for a not-completed part with an interrupted flag assigned at the division processing by predetermined postponement duration. On the other hand, there is a case in the production facility manufacturing process, for example, where a job with high priority (e.g., urgent job) is planned later due to a change of the manufacturing plan or the like, meaning that the priority of the interrupted job decreases relatively.

Then, in Embodiment 2, a determination is made for the not-completed part with an interrupted flag assigned at the division processing whether reversing processing is to be executed or not using the delivery time, the priority or the like as a determination criterion in the unit duration of the plan or of the scheduling, and then a new job plan is created. Since the configuration other than the reversing processing by the scheduling creation unit 5 is substantially similar to that of Embodiment 1, similar reference numerals are assigned, and their detailed descriptions are omitted.

Figure 6:
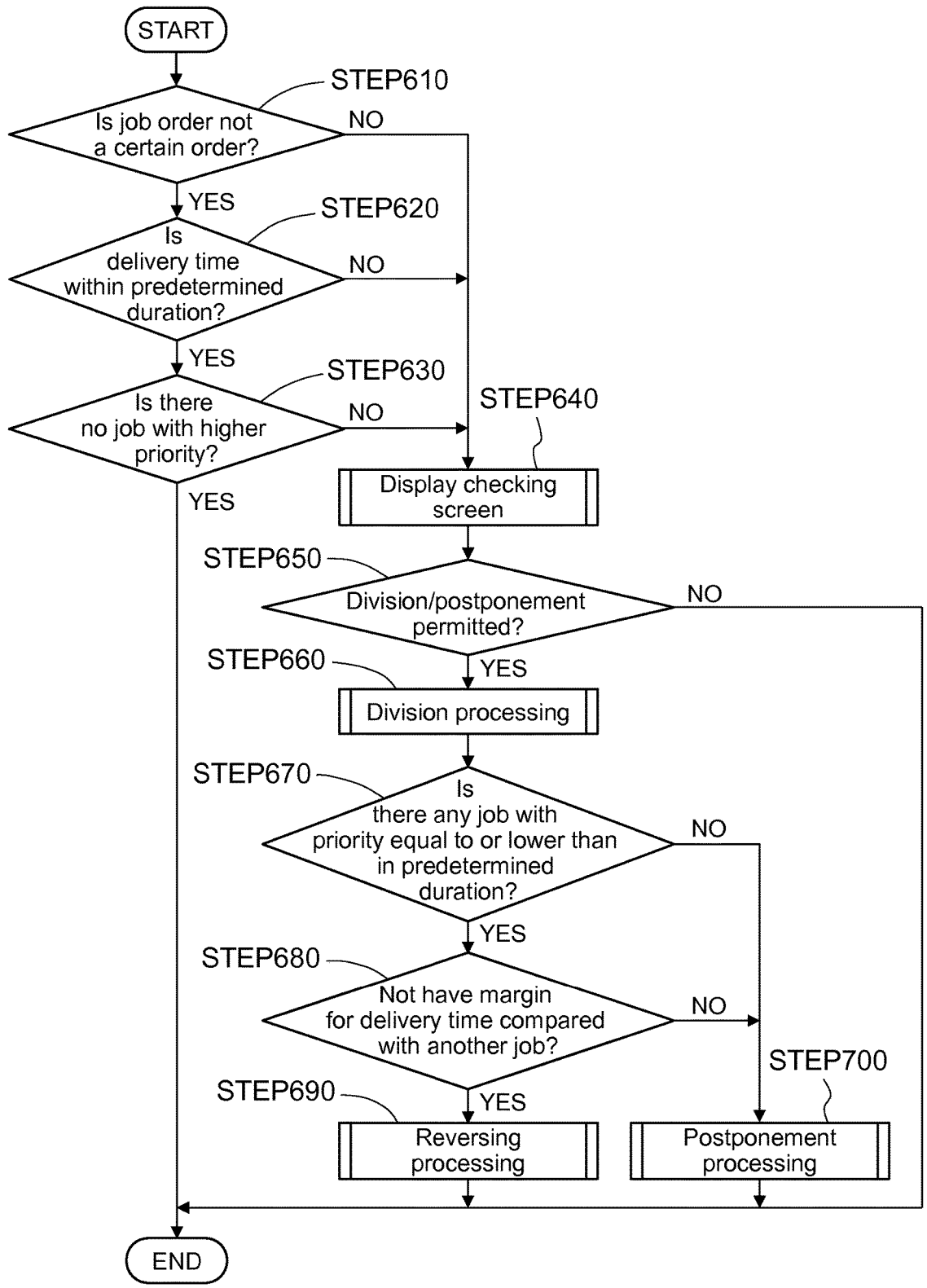
FIG. 6 is a flowchart to describe the reversing processing flow and postponement processing flow according to a job plan creation system that is Embodiment 2 of the present invention.

FIG. 6 is a flowchart to describe the flows of the reversing processing and postponement processing according to a job plan creation system (scheduling creation unit 5) that is Embodiment 2 of the present invention.

As illustrated in FIG. 6, similarly to the above Embodiment 1, the scheduling creation unit 5 firstly determines, for a job with an interrupted flag assigned, whether the corresponding job order is a certain order relating to a certain job that does not relate directly to the production of the product (STEP 610), and when it is determined as the certain order, the procedure proceeds to STEP 640. When the job order is not determined as the certain order, the procedure proceeds to STEP 620.

Next, the scheduling creation unit 5 determines, for the job corresponding to the job order that is not determined as the certain order at STEP 610, whether the delivery time of the job is within predetermined duration or not (STEP 620). When it is determined that the delivery time is not within the predetermined duration (the duration is long enough), the procedure proceeds to STEP 640, and when it is determined that the delivery time is within the predetermined duration (the duration is not long enough), the procedure proceeds to STEP 630.

Next, the scheduling creation unit 5 determines, for the job that is determined that the delivery time of the job is within predetermined duration at STEP 620, whether there is another job with priority higher than that of the job within predetermined duration (e.g., unit duration of a predetermined plan or of scheduling) or not (determination by a relative comparison) (STEP 630), and when it is determined that there is another job with high priority, the procedure proceeds to STEP 640. On the other hand, when there is no job with high priority, i.e., the priority of the job is the highest, the procedure ends, and as described above with reference to FIG. 4, the scheduling creation unit 5 reconfigures the job plan so as to put higher priority on the interrupted job extracted by the scheduling creation unit 5 than a delayed job, a not-started job or the like, and makes the display device of the input terminal 50, for example, display the job plan.

To check with an operator, a supervisor or the like whether the processing (division processing and postponement processing) can be executed or not so as to divide the interrupted job that is determined as corresponding to the certain order, as having the delivery time not within the predetermined duration (the duration is long enough) or as there being another job with priority higher than that of the job into a completed job part (completed part) and a not-completed job part (not-completed part, remaining job part), and to postpone the not-completed part, the scheduling creation unit 5 makes the display device of the input terminal 50, for example, display the checking screen (STEP 640).

Next, the scheduling creation unit 5 determines whether the execution of the division processing and postponement processing is permitted or not through the checking screen displayed at STEP 640 (STEP 650), and when it is determined that the execution of the division processing and postponement processing is permitted, the procedure proceeds to STEP 660. On the other hand, when it is determined that the execution of the division processing and postponement processing is not permitted (prohibited), the procedure end, and as described above with reference to FIG. 4, the scheduling creation unit 5 reconfigures the job plan so as to put higher priority on the interrupted job extracted by the scheduling creation unit 5 than a delayed job, a not-started job or the like, and makes the display device of the input terminal 50, for example, display the job plan.

Next, for the interrupted job that is determined so that the execution of the division processing and postponement processing thereof is permitted at STEP 650, the scheduling creation unit 5 divides it into a completed part and a not-completed part, assigns a completed flag to the completed part and newly assigns an interrupted flag to the not-completed part (division processing) (STEP 660).

Next, the scheduling creation unit 5 determines, for the not-completed part, to which the interrupted flag is assigned at STEP 660, whether there is another job with priority that is equal to or lower than that of the job or not within predetermined duration (e.g., unit duration of a predetermined plan or of scheduling) (determination by a relative comparison) (STEP 670), and when it is determined that there is another job with priority equal to or lower than that of the job, the procedure proceeds to STEP 680. When it is determined that there is no job with priority equal to or lower than that of the job, the procedure proceeds to STEP 700.

The scheduling creation unit 5 determines, for the not-completed part that is determined that there is another job with priority equal to or lower than that of the job at STEP 670, whether the job does not have margin for the delivery time compared with another job or not within predetermined duration (e.g., predetermined duration that becomes the determination criterion of the margin for delivery time that is used at STEP 620) (STEP 680), and when it is determined that the job does not have margin for the delivery time, the procedure proceeds to STEP 690, and when it is determined that the job has margin for the delivery time, the procedure proceeds to STEP 700.

Then, for the not-completed part that is determined that there is another job with priority equal to or lower than that of the job at STEP 670 and is determined as not having margin for the delivery time compared with another job at STEP 680, the scheduling creation unit 5 reverses the order of the not-completed part and the job that is determined as having priority equal to or lower than that and as having margin for the delivery time on the job plan (reversing processing) to reconfigure a new job plan, and makes the display device of the input terminal 50, for example, display the job plan (STEP 690). The job that is reversed in the order with the not-completed part will be postponed by predetermined postponement duration and be incorporated into the job plan similarly to at STEP 570 of Embodiment 1 as stated above.

For the not-completed part that is determined that there is no job with priority equal to or lower than that of the job at STEP 670 or is determined as having margin for the delivery time compared with another job at STEP 680, the scheduling creation unit 5 postpones the operating time of the not-completed part by predetermined postponement duration (postponement processing) similarly to at STEP 570 of Embodiment 1 as stated above, reconfigures a new job plan so that the job will not be a target of the job plan before the operating time, and makes the display device of the input terminal 50, for example, display the job plan (STEP 700).

For the job (not-completed part), which is reversed in the order by the reversing processing at STEP 690, a determination may be made as to whether there is still another job, with which the order can be reversed, to reconfigure a new job plan.

In this way, according to Embodiment 2, the order on a job plan of a not-completed part with an interrupted flag assigned can be reversed with another job on the basis of the relationship with the other job (relative comparison) within predetermined duration using the priority, the delivery time or the like as determination criteria, or the job can be postponed by predetermined duration. This can create an optimum job plan even when a job with high priority (e.g., urgent job) is planned later due to a change of the manufacturing plan or the like, meaning that the priority of the interrupted job decreases relatively, and so can further increase the manufacturing efficiency or the processing efficiency and can further shorten the lead time to manufacture the production facilities and suppress their manufacturing cost.

That is a detailed description of the embodiments of the present invention. However, the present invention is not limited to the above-stated embodiments, and the design may be modified variously without departing from the spirits of the present invention defined in the attached claims.

DESCRIPTION OF SYMBOLS

1 Order-receiving system
2 Component table system
3 Facility manufacturing system
4 Process plan creation unit
5 Scheduling creation unit (job plan creation system)
6 Job instruction creation unit
10 Facility manufacturing/management supporting system

What is claimed is:
1. A job plan creation system comprising:
at least one processor configured to:
create a job plan for each job of a plurality of jobs on a basis of starting states of the jobs;
extract, out of the job plan, at least one interrupted job that has been started but has not yet been completed, at least one delayed job that should have been started based on the job plan but has not yet been started, and at least one not yet-started job that is scheduled to be started on the job plan and so has not yet been started from the job plan;
set initial priorities of the jobs in the job plan such that the priorities have a tentative order of the interrupted job(s), the delayed job(s) and the not yet-started job(s);
determine whether one of the at least one interrupted job should be postponed or not based on a postponement condition; and
when the one of the at least one interrupted job should be postponed: (a) divide the one interrupted job into a complete part and a not-completed part, (b) reconfigure the job plan by postponing the operating time of the not-completed part only by a predetermined duration, and (c) control a display to display the reconfigured job plan, wherein the at least one processor is further configured to: reconfigure the job plan by reversing the order on the job plan of the not-completed part and another job, which is determined as having a production plan priority that is equal to or lower than a production plan priority of the not-completed part and determined as having a margin for a delivery time compared with the not-completed part, and which is thus determined later as having a production plan priority that is relatively higher than the production plan priority of the not-completed part;
a central computer, that includes the at least one processor, configured to: collectively control an operating state of a plurality of Numerical Control (NC) machine tools disposed along a plurality of processing lines based on the reconfigured job plan.

2. The job plan creation system according to claim 1, wherein the postponement condition is a condition on a basis of at least one of: a type of the one interrupted job, a margin for a delivery time of the one interrupted job, and a production plan priority of the one interrupted job.

3. The job plan creation system according to claim 1, wherein the postponement condition is based on a condition of whether or not a delivery time of the one interrupted job is within the predetermined duration.

4. The job plan creation system according to claim 1, wherein the postponement condition is based on the production plan priority of the one interrupted job.

5. The job plan creation system according to claim 1, wherein the postponement condition is based on whether the predetermined duration is long enough to complete the job by the delivery time on the basis of a standard operating time of the not-completed part.

6. The job plan creation system according to claim 5, wherein the standard operating time is an actual operating time value by a certain operator, an average of actual operating times by a plurality of operators, or an expected value that is expected from an actual operating time value by the certain operator or the actual operating times by the plurality of operators, which are collected by a performance collection system.

7. The job plan creation system according to claim 1, wherein the postponement condition is based on whether or not the one interrupted job relates directly to the production of a product.

8. The job plan creation system according to claim 1, wherein the at least one processor is configured to reconfigure the job plan the basis of the progress of each job that is transmitted from a performance collection system after the completion of the jobs on one day, but before a job starting time of the job plan for the following day.

9. The job plan creation system according to claim 1, wherein the displayed reconfigured job plan includes a vertical axis representing identification symbols of the NC machine tools disposed at each processing line, and a horizontal axis representing a date/time where each job in the reconfigured job plan is represented as rectangular blocks.

10. The job plan creation system according to claim 1, further comprising a performance collection system that collects actual performance data on the jobs including the starting or the completion of the respective job, the operating time required for the job, and an operator performing the job.

11. The job plan creation system according to claim 1, wherein the plurality of jobs are manufacturing process jobs of one or more production facilities, and the job plan is reconfigured so at to create a production plan so as not to generate wasted idle time at each line for better manufacturing efficiency of each manufacturing line or processing line.

* * * * *